Sept. 15, 1931.  B. C. COONS  1,823,854
FRUIT PARING MACHINE
Filed Nov. 24, 1928  9 Sheets-Sheet 5
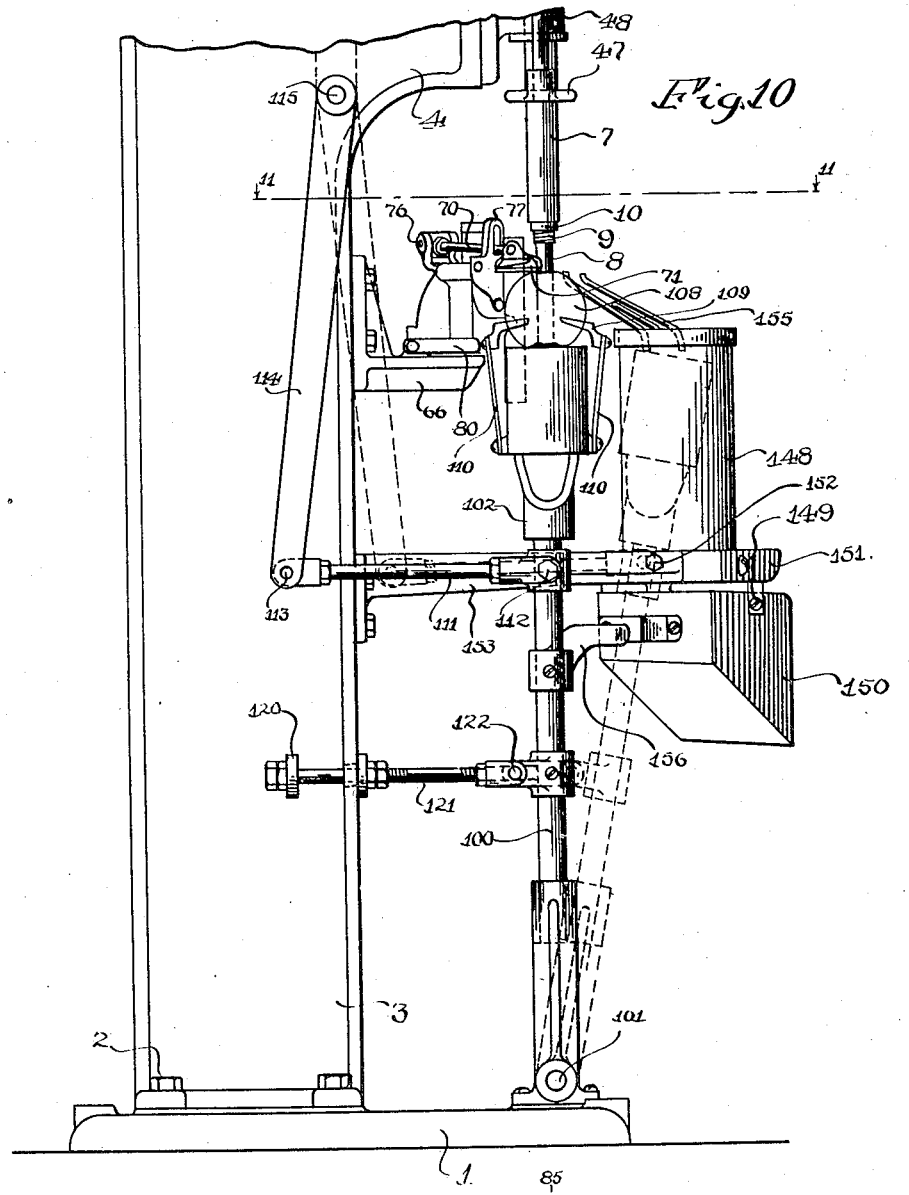
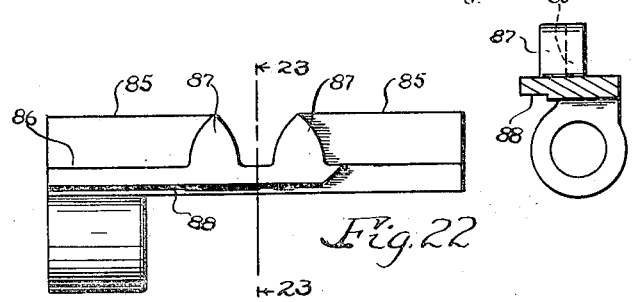
INVENTOR
Burton C. Coons
BY H. H. Simons
his ATTORNEY

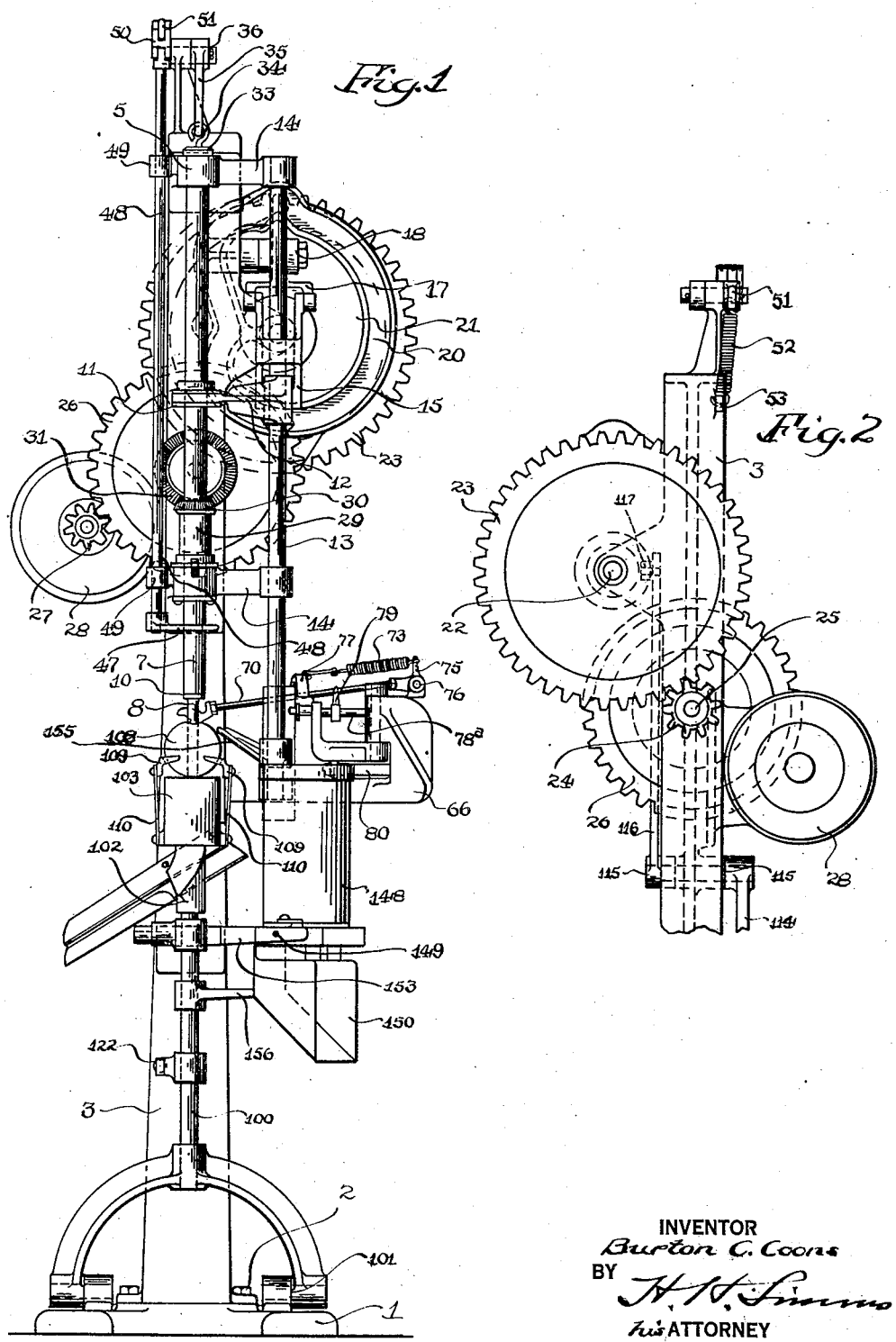

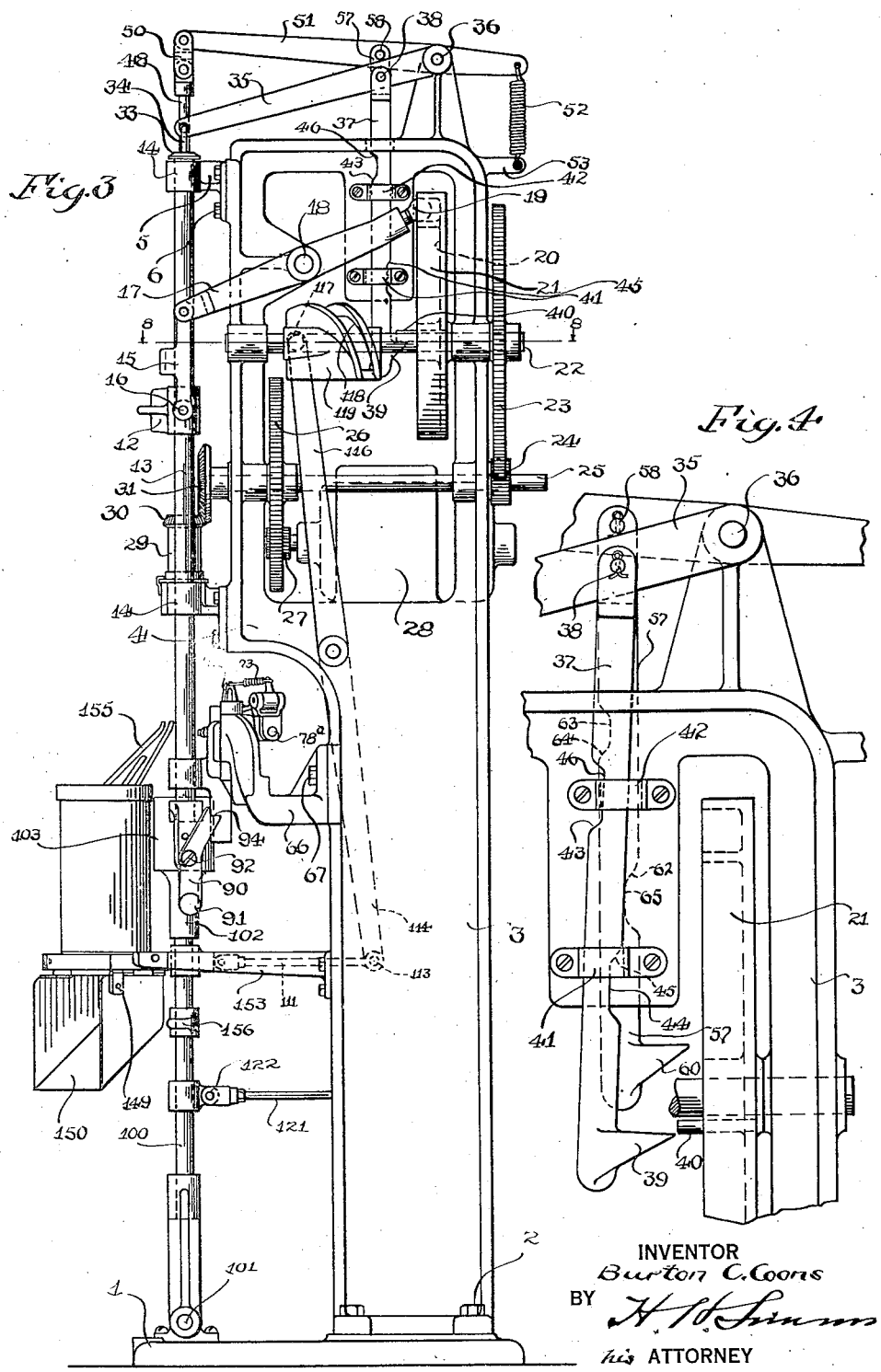

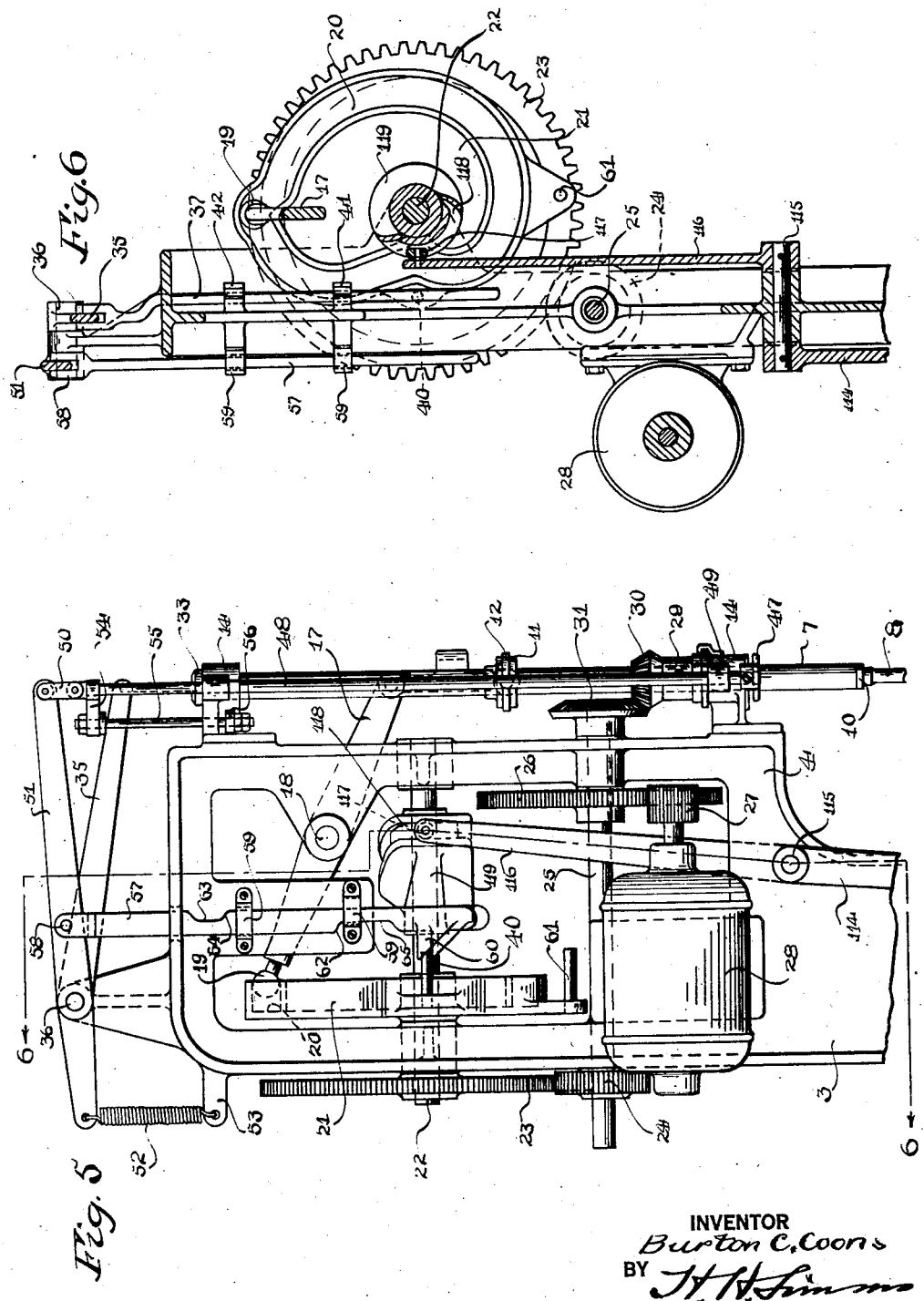

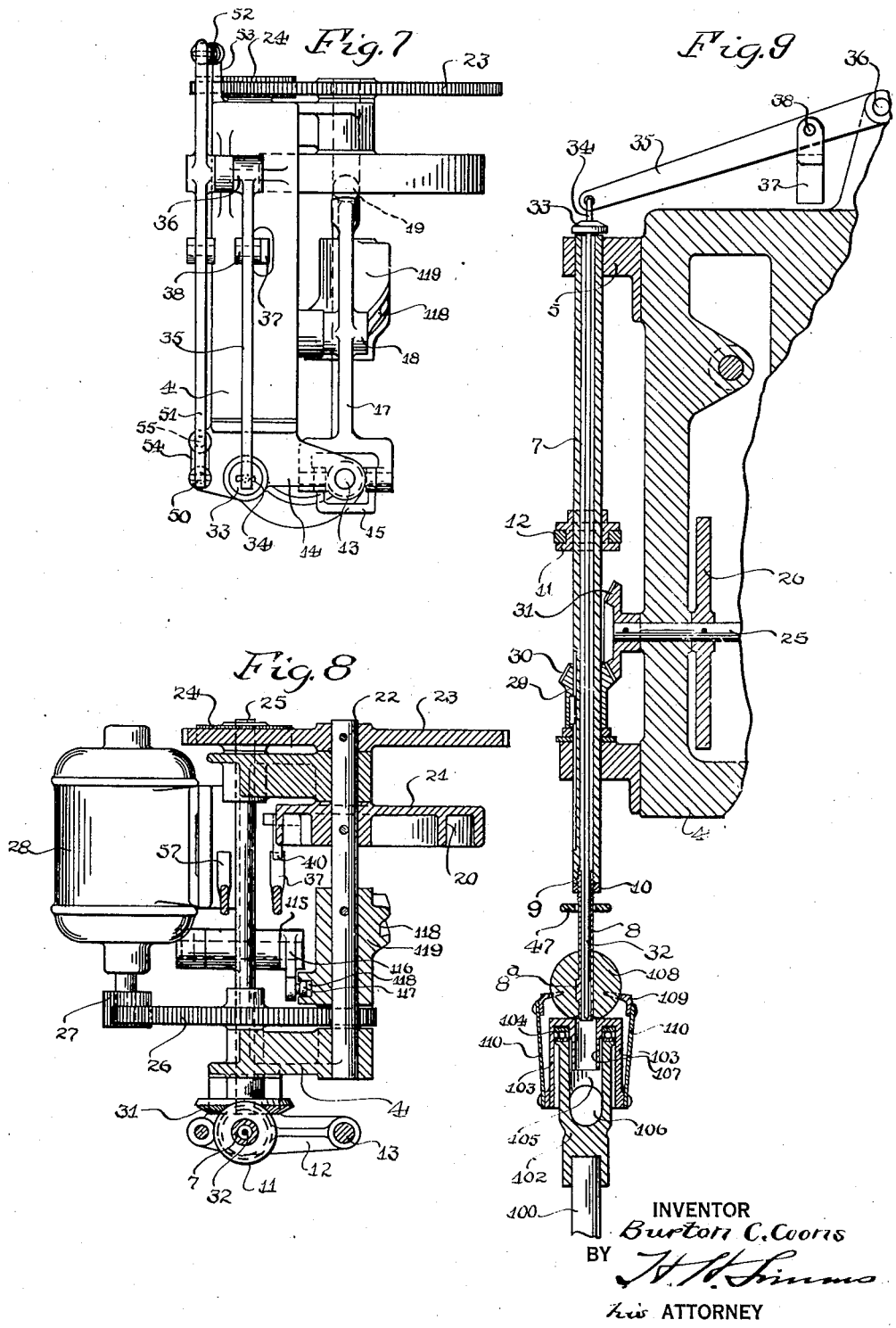

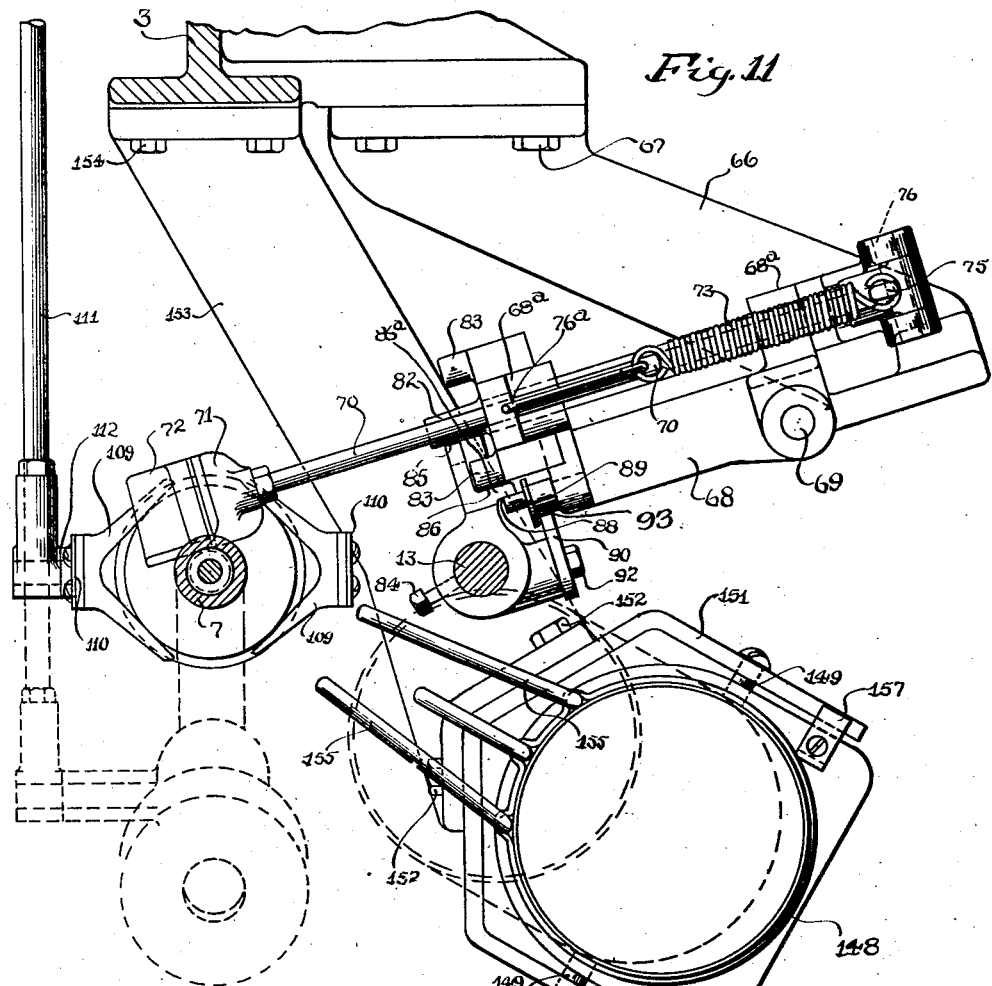

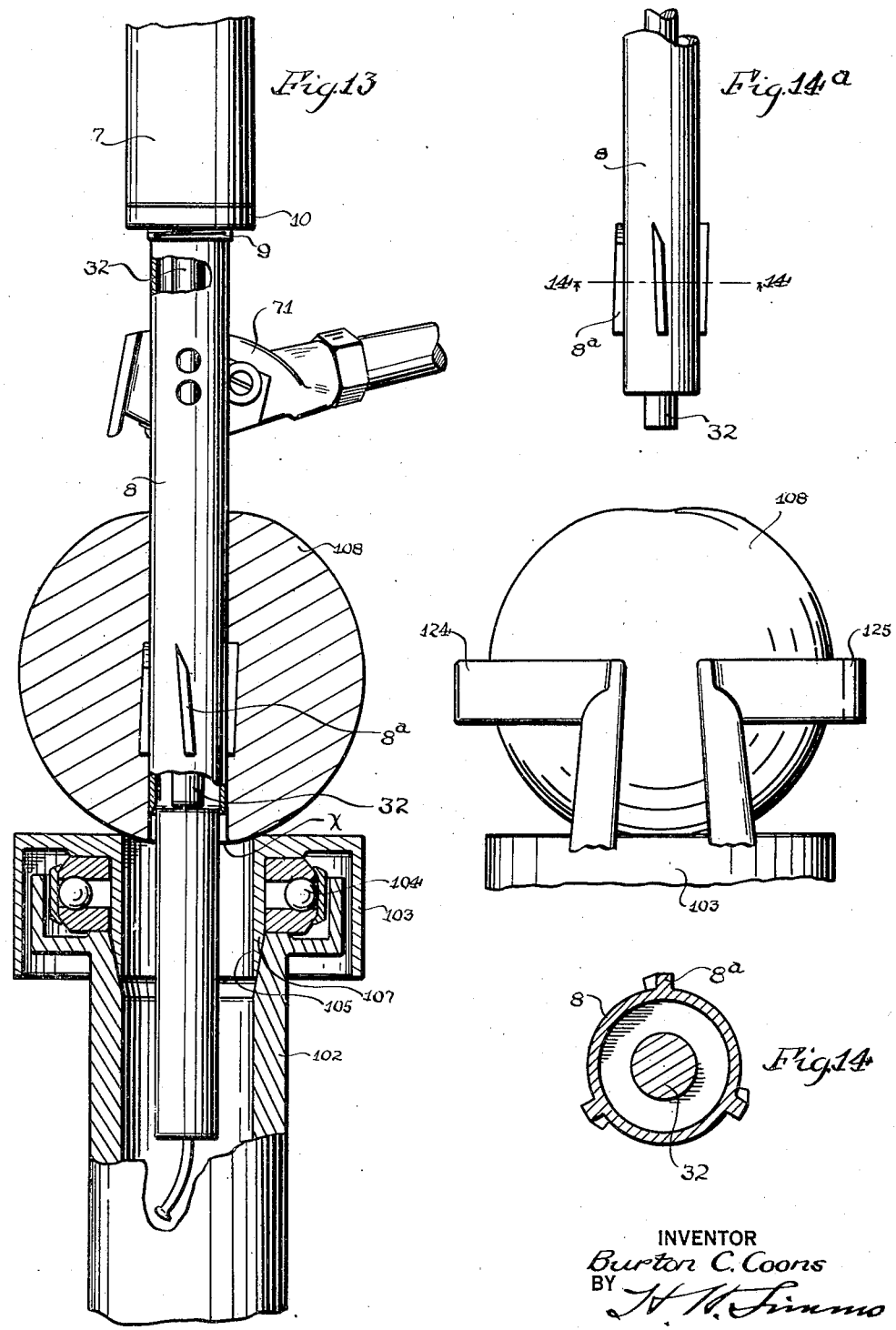

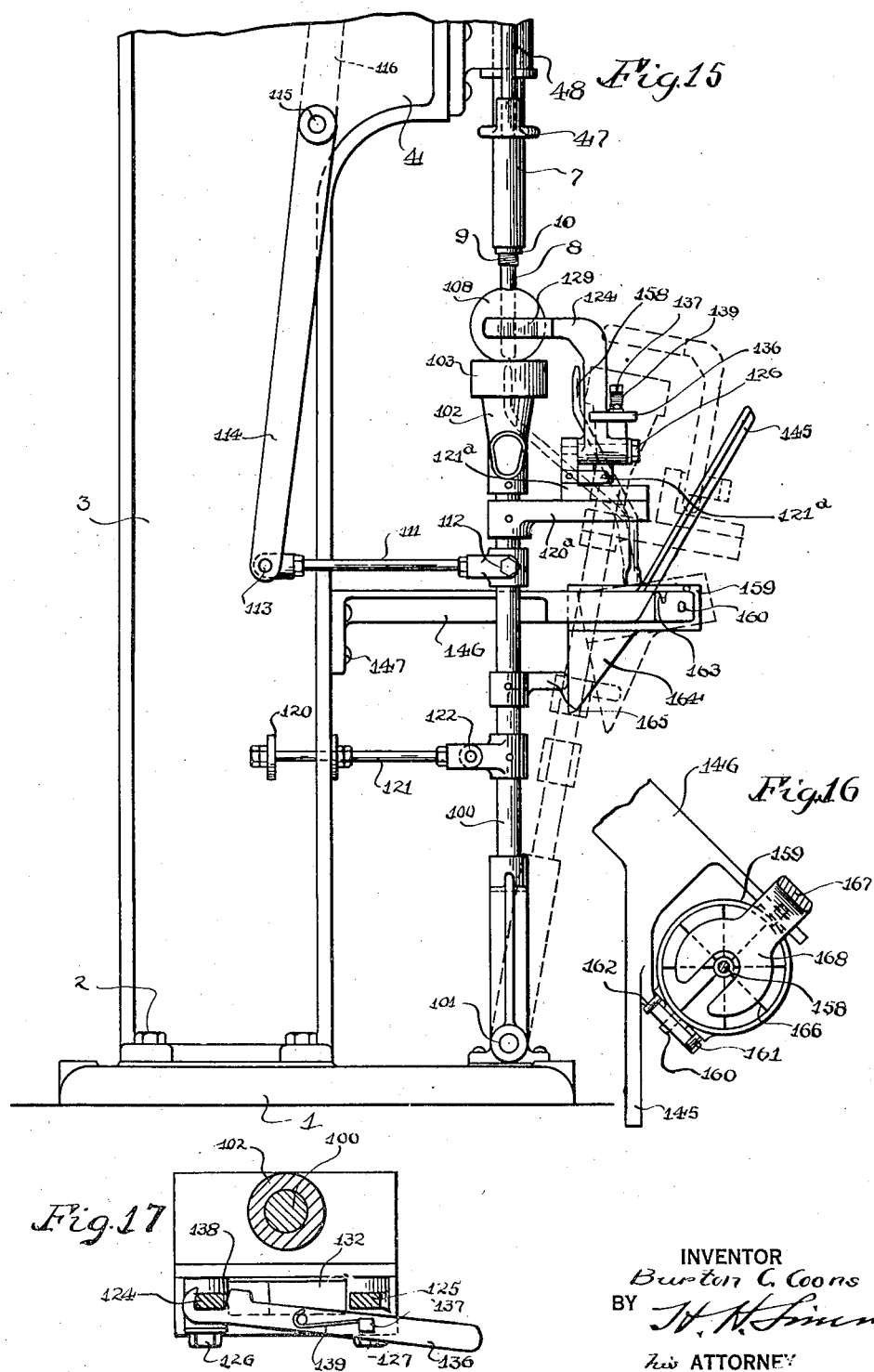

Sept. 15, 1931.  B. C. COONS  1,823,854
FRUIT PARING MACHINE
Filed Nov. 24, 1928   9 Sheets-Sheet 9
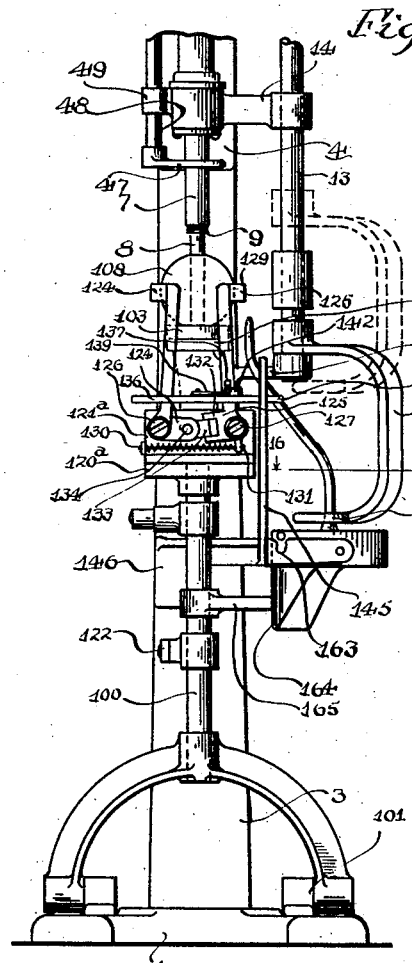
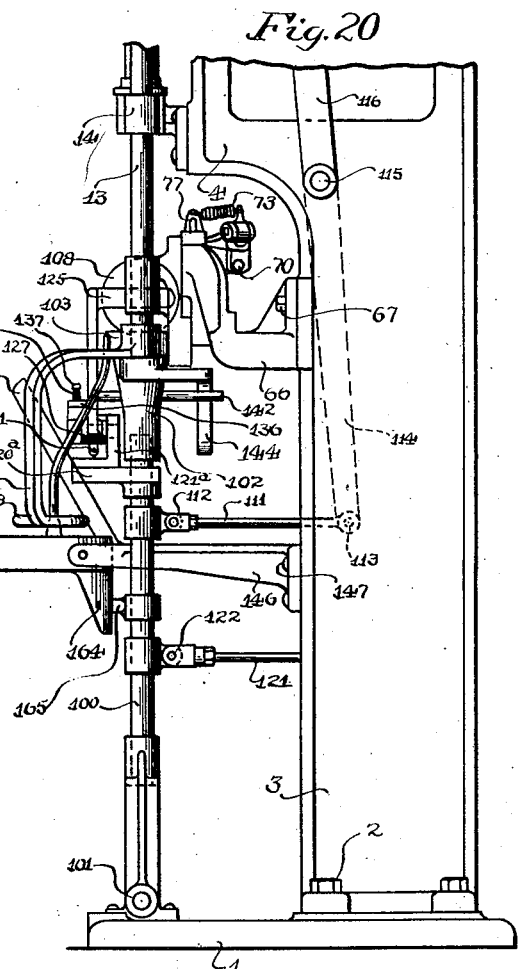
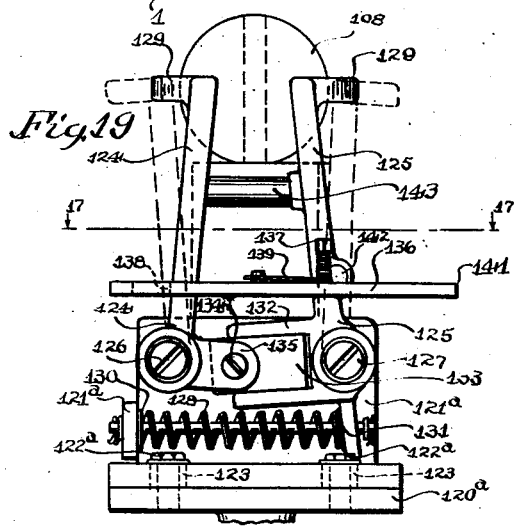
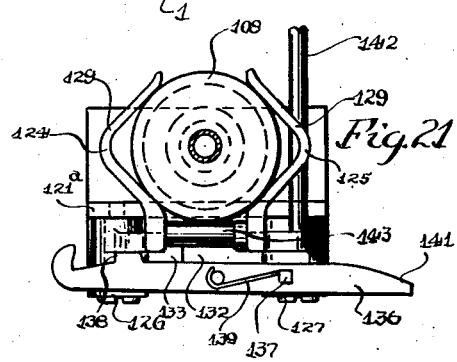
INVENTOR
Burton C. Coons
BY N. H. Simms
His ATTORNEY Patented Sept. 15, 1931

1,823,854

UNITED STATES PATENT OFFICE

BURTON C. COONS, OF ROCHESTER, NEW YORK, ASSIGNOR TO COONS MACHINERY CORPORATION, OF GATES, NEW YORK

FRUIT PARING MACHINE

Application filed November 24, 1928. Serial No. 321,676.

The present invention relates to fruit paring machines. An object thereof is to provide an improved construction for presenting the fruit to a supporting device on which the fruit is pared and which has a continuous rotation, that is, does not stop rotation in order that the fruit may be presented thereto, so that there is no tendency for the fruit to split or break on the supporting device due to the sudden starting of the rotation of the supporting device after stopping. Another object of the invention is to provide a fruit holder with a rotatable rest portion combined with a supporting device which will penetrate the fruit on the rest portion to impart a rotation to the fruit, while permitting a slipping of the corer in the fruit until the speed of rotation of the fruit equals that of the supporting device, when that latter enters into holding engagement so that the supporting device and holder may be separated, thus making the paring of soft apples possible. Still another object of the invention is to provide a construction in which the corer will break the skin from the apple in the concavity in proximity to the stem or blow end, thus doing away with expensive hand trimming or waste due to repeeling at such concave end. A further object of the invention is to provide a construction which will make it possible to provide a thin paring on the fruit irrespective of the size of the latter. A still further object of the invention is to provide an improved means for feeding fruit to the supporting device on which the fruit is pared. Still another and further object of the invention is to provide an improved paring mechanism which permits the knife thereof to be moved away from the support on which the fruit is pared in order that the fruit may be pushed off such support without interfering with the paring mechanism. Still another object of the invention is to provide a receiver which moves into a line with the supporting device on which he fruit is pared in order to receive the pared fruit from such supporting device. A still further object of the invention is to provide a fruit holder having a rotating rest on which the fruit is supported while being penetrated by the supporting device on which the fruit is pared, provision being made whereby the fruit is centered on the rest portion before being presented to the supporting device. A still further object of the invention is to provide a novel means of positively ridding the fruit of its core before the paring takes place. A still further object of the invention is to provide a construction in which the paring is effected on a vertically arranged corer to which the fruit is presented by a holder below the corer having a rest portion movable into and out of alinement with the corer.

To these and other ends, the invention consists of certain parts and combinations of parts all of which will be hereinafter described: the novel features being pointed out in the appended claims.

In the drawings:

Fig. 1 is a front view of a paring machine constructed in accordance with this invention with parts being shown in the positions they occupy just prior to the starting of the operation;

Fig. 2 is a rear view of the upper portion of the machine;

Fig. 3 is a view in side elevation of the machine illustrated in Fig. 1;

Fig. 4 is a side view of the upper portion of the machine;

Fig. 5 is a side view of the upper portion of the machine opposite the side illustrated in Fig. 4;

Fig. 6 is a section on the line 6—6, Fig. 5;

Fig. 7 is a top view of the machine;

Fig. 8 is a section on the line 8—8, Fig. 3;

Fig. 9 is a fragmentary vertical section in the plane of the fruit support and the fruit holder;

Fig. 10 is an enlarged side view of the bottom portion of the machine showing the side opposite to that illustrated in Fig. 3;

Fig. 11 is a section on the line 11—11, Fig. 10;

Fig. 12 is an enlarged fragmentary view of the parts in the positions shown in Fig. 1;

Fig. 13 is a fragmentary sectional view showing a core being ejected from an apple; Fig. 14ª is a fragmentary view showing the corer and fruit support positioned above a centered apple on the fruit holder;

Fig. 14 is a section on the line 14—14, Fig. 14ª;

Fig. 15 is a side view of the lower portion of another embodiment of the invention in which the centering jaws of the fruit holder are modified and the receiver has a slicer associated with it;

Fig. 16 is a section on the line 16—16, Fig. 18;

Fig. 17 is a section on the line 17—17, Fig. 19;

Fig. 18 is a front view of the lower portion of the embodiment shown in Fig. 15;

Fig. 19 is a detail view of the fruit holder looking from the front of the machine;

Fig. 20 is a side view of the machine as illustrated in Fig. 18;

Fig. 21 is a plan view of the work holder;

Fig. 22 is a side view of the operator for the paring knife; and

Fig. 23 is a section on the line 23—23, Fig. 22.

Commercial paring machines prior to this invention have employed a fork or supporting device which stops to permit the fruit to be fed thereto and then starts so that the paring knife may operate about the same, the coring taking place after the paring operation and leaving on the stem end of the fruit a small ring of paring unless the knife is caused to repeat its operation at the stem end in which event considerable waste takes place. The stopping and starting action of the fork has two disadvantages namely; first, it prevents the proper paring of large and soft apples due to the breaking of a large number of apples, and second it prevents the support for the fruit making a sufficient number of rotations to cause the knife to travel a sufficient number of times to make a thin paring. The leaving of a small ring about the stem end of the fruit makes it necessary to remove this ring by hand and this while reducing waste adds to the labor cost.

In this invention, the support for the apple preferably rotates continuously during the operation of the machine so that the breaking of large and soft fruit does not take place while at the same time for each fruit the support rotates a greater number of times making it possible to reduce the size of the cut made by the paring knife, as the greater the width of the cut, the greater is the waste, provision being made so that the support may pick up the fruit while stationary without injury to the fruit.

The support for the fruit during paring is preferably the corer so that the operation of coring is combined with the pick-up of the fruit for paring. At the same time, the removal of the skin or paring from the stem end in the cavity about the core is effected without waste or loss of labor. It is further possible to reduce the size of the corer because with the present commercial machines, the corer is compelled to be of sufficient size to pass about the fork or supporting device. The smaller the diameter of the corer, the less waste in fruit. Furthermore, the twisting and bending of the tines on the fork is eliminated and the corer extends entirely through the fruit giving better support during paring. The core is positively ejected and does not remain in the fruit as when cut after paring.

The supporting device or corer is vertically arranged, thus giving better opportunity to feed the same and get rid of the parings and cores as well as collecting the pared fruit. At the same time, the paring knife operates horizontally and the weight of the knife head does not enter into any material consideration in paring, for it has been found that the weight of the knife head affects the thickness of the paring and consequently the waste. The grading of fruit is eliminated as small and large fruit may be pared with the same adjustment of the knife, due to the thickness of the paring. Heretofore, this would have meant a waste of at least twenty-five percent in small apples.

Referring more particularly to the drawings, 1 indicates a base to which is bolted at 2 an upright frame 3 having forwardly projecting portions 4. On the forwardly projecting portion 4 brackets 5 are secured at 6 and serve to support an axially movable and rotatable tubular corer support 7 which is vertically arranged and has a tubular corer 8 detachably secured by screw threads 9 in the lower end of the corer support where it is held by a nut 10. Rigid ribs 8ª are provided to prevent the turning of the fruit on the corer.

Axial movement of the corer support may be effected through a grooved collar 11 secured to the corer support 7 between the brackets 5 to turn with the corer support. This collar 11 is engaged by a yoke 12 which projects laterally from a sliding rod or plunger 13 guided on the main frame through brackets arms 14. Movement of this sliding rod 13 is effected through a yoke 15 pivoted at 16 to opposite sides of the yoke 12 and having the yoked end of a lever 17 pivoted thereto. The lever 17 is pivoted at 18 to the main frame and has at its opposite end a ball 19 which travels in a cam groove 20 in a cam member 21 which is mounted on a shaft 22 journalled in the main frame. This shaft 22 also carries a large gear 23 meshing with a pinion 24 on a shaft 25. On this shaft 25 is also a large gear 26 meshing with a pinion 27 on the shaft of a motor 28 supported by the main frame.

Rotation of the corer support 6 may be effected through a sleeve 29 which is journalled on the lower bracket 5 and has a sliding key connection with the corer support 7, permitting the latter to move axially therethrough. This sleeve 29 has a beveled gear 30 which meshes with the beveled gear 31 on the shaft 25 so that the corer is rotated through the motor 28.

Associated with the corer is the core ejector 32 which, in this instance, comprises a rod extending through the corer support 7 and the corer 8 to the upper end of the corer support. At its upper end, a collar 33 is provided to limit the downward movement of the core ejector. For moving the core ejector the latter may have at its upper end an eye 34 to which a lever 35 is pivoted. This lever is pivoted at 36 to the main frame and is operated through a depending link or pull bar 37 which is pivoted at 38 to the lever. At its lower end, this pull bar is provided with a shoulder or abutment 39 adapted to be engaged by a projection 40 on the cam 21. The pull bar is guided by two guide straps 41 and 42 slightly out of vertical alignment with each other and having a width substantially equal to the main portion of the pull bar 37. The lever 35 is raised when the corer support 7 is elevated, this being accomplished through the collar 33 at the upper end of the core ejector 32 engaging the upper end of the corer support 7. At this time the cam surface 43 on the pull bar 37 engages the lower edge of upper strap 42 and shifts the pull bar laterally, the adjacent side of the lower strap 41 entering the notch 44 of the pull bar and the projection or abutment 39 being moved into the path of the projection 40. The rotation of the cam 21 causes the projection 40 to engage the abutment 39 and pulls the bar 37 downwardly. As the bar 37 moves downwardly, the cam portion 45 on the bar engages the lower strap 41 and knocks the projection 39 out of engagement with the projection 40, the recess 46 at this time lying opposite the upper strap or guide 42 to permit the lateral shifting of the pull bar 37.

The stripping of the fruit from the corer may be effected by a stripping member 47, in this instance, in the form of a ring to surround the corer support and corer. This ring is suspended from the lower end of a rod 48 guided in brackets 49 on the main frame and having operating mechanism connected to the upper end thereof. In this instance, this operating mechanism comprises a link 50 pivoted to the upper end of the rod 48 and to one end of a double arm lever 51 which is pivoted at 36 to the main frame and has a spring 52 connected to its other end and to an arm or projection 53 on the main frame so that the spring normally holds the stripper in an elevated position. In order to limit the upward movement of the arm under the action of the spring, an arm 54 is projected from the upper end of the rod 48 and has a guide rod 55 depending therefrom and guided in the upper bracket 49, a stop 56 being provided at the lower end of the guide 55 to cooperate with the bracket 49 in order to limit the upward movement of the lever 51. Movement of the lever 51 downwardly against the action of the spring 52 to strip the fruit off the corer is preferably effected through a pull bar 57 pivoted at 58 to the lever 51 and depending from said lever through two guides or straps 59 secured to the main frame of the machine one above the other. This pull bar has a projection or abutment 60 at its lower end adapted to be engaged by a projection 61 on the cam member 21 so as to pull the pull bar downwardly. The straps 59 are out of alignment and have guide surfaces substantially as wide as the normal width of the pull bar. As the pull bar descends under the action of the projection 61, a cam surface 62 thereon cooperates with the lower strap 59 and kicks the pull bar out of the path of the projection 61, a notch 63 at this time receiving a side of the upper strap 59 to permit the lateral movement of the pull bar 57. On the upward movement of the pull bar 57 under the action of the spring 52, the cam 64 cooperates with the upper strap 59 and shifts the projection 60 into the path of the projection 61, the notch 65 permitting the lateral movement of the pull bar 57 at this time.

The paring of the fruit takes place while the fruit is on the corer 8. This is accomplished through a paring mechanism comprising, in this instance, a bracket arm 66 Figs. 10, 11 and 12 which is bolted at 67 in a fixed position to the main frame 3 below the forwardly extending portion. On this bracket is mounted a swinging carriage 68 which is adapted to turn about an axis 69, in this instance vertically arranged and parallel with the axis of rotation of the corer 8. The carriage 68 has mounted to turn thereon a swinging carriage 78 about an axis at right angles to the axis 69 Fig. 12. In this instance, the carriage 68 has two ears 68ª in which a pivot rod 78ª on the carriage 78 turns. Mounted to turn about an axis 69 on the carriage 78 at right angles to the axis of swinging of the carriage 78ª is a stem or knife arm 70 carrying on its outer end a knife head 71 of any construction and provided with a knife 72. A spring 73 secured adjustably at 74 to an arm 75 on the knife stem adjacent the pivot or axis 76 also connects at 76ª with a slotted guide 77 mounted on the carriage 78 and in which the knife stem 70 travels so as to move toward and from the center of the apple or fruit while the carriage 78 swings the knife in an arc conforming to the contour of the fruit. A stop 79 Fig. 12. is adjustable on the rod 78ª in the direction of the axis of turning of the carriage 78 and cooperates with the stem or knife arm 70 to determine the swinging of the knife toward the fruit so that the knife properly engages the latter. The swinging carriage 68 has its movement in one direction resisted by a resilient spring arm 80 Fig. 12 on the bracket arm 66 cooperating with a projection 81 on the carriage 68 so as to yieldingly resist the movement of the carriage in the direction to move the knife 72 away from the apple or fruit. Movement of the carriage 78 about its axis on the carriage 68 may be effected by providing three projections 82 and 83 Fig. 11, there being two of the latter, both shorter than the projection 82 and both arranged to one side of the projection 82. On the plunger or rod 13 is secured by a bolt 84 an operator Figs. 11, 12, 22 and 23 having, in this instance, two aligned guide surfaces 85 separated by a notch or recess 86. With these aligned guides 85 that portion of the projection 82 beyond the projections 83 cooperates. The operator also has two aligned guides 86ª arranged parallel with but to one side of the guides 85, one for engagement by one of the projections 83 and the other for engagement by the other projection 83. Two projections or stops 87 extend from the guides 86 to the guides 85 and are separated by a space between the guides 85. The operator also has a guide surface 88 which is parallel with the guide surfaces 85 and 86 and is on that side of the operator opposite the side provided with the guides 85 and 86. With this guide surface 88, a projection 89 on the carriage 68 Fig. 11 cooperates so that the carriage 68 is held against swinging in either direction while cooperating with the guide 88, due to the fact that the opposite sides of the operator are engaged respectively by the projection 89 and the projections 82 and 83. The lower end of the guide 88 is above the lower end of the lower guide 86 so that the projection 89 will move out of engagement with the guide 88 and permit the carriage 68 to be swung against the action of the spring 80 to carry the knife away from the fruit on the corer while the fruit is being pushed off the corer.

Movement of the carriage 68 to carry the knife 72 away from the fruit is effected when the operator moves upwardly. This is accomplished through a pivoted or gravity pawl 90 weighted at 91 and pivoted at 92 to the lower portion of the operator for the paring member Figs. 3, 11 and 12. As this pawl moves upwardly with the rod or plunger 13, a shoulder 94 on the pawl 90 during the latter part of the upward movement, engages this projection 93 and shifts the carriage 68 against the action of the spring 80 so that the knife 72 will be carried and held away from corer.

Two means are shown for presenting the fruit to the corer, one of said means being illustrated in Figs. 1 to 14 inclusive and the other of said means being illustrated in Figs. 15 to 21 inclusive.

In the first mentioned means, a swinging support 100 is pivoted at 101 to the base 1 and has a head 102 at its upper end supporting a rotatable fruit rest comprising, in this instance, an inverted cup shaped member 103 supported upon the upper end of the head by ball bearings 104 so as to turn freely upon the head 102. The head has a central opening 105 with a lateral outlet 106 at its lower end. Into the upper end of this central opening is a depending tubular member 107 which opens at the top of the fruit rest and is of a size to permit the rotary corer 8 to pass therein so that when the fruit 108 supported on the fruit rest is engaged by the corer 8, the corer may be passed through the fruit in its downward movement without contacting with the fruit holder. At the same time this opening provides a space into which the core removed by the corer may be ejected by the core rejector 32. The upper surface of the rotary support 103 is substantially flat so that the flat ends of the apple or other fruit may rest thereagainst.

The centering of the apple or other fruit on this rest may be obtained by two V shaped jaws 109 arranged to cooperate with opposite sides of the apple and supported by spring arms 110 so that the apple may be introduced downwardly between the jaws, the latter spreading and centering the apple on the rest while the latter is swung outwardly out of line with the corer, after which the apple is swung inwardly so that the apple core aligns with the corer 8. Movement of the rest for the apple into and out of alignment with the corer may be effected through the link 111 pivoted at 112 to the support 100 and pivoted 113 to an arm 114 on the rock shaft 115 which is mounted to turn horizontally on the frame 3. This rock shaft also carries an arm 116 projected upwardly therefrom and provided at its upper end with a roller 117 which operates in a cam groove 118 in a cam 119 mounted on the shaft 22, the cam being so formed that the fruit holder is timed to move outwardly to receive another fruit while a fruit on the corer is being pared and the ejecting mechanism or push off is being moved to displace a pared apple from the corer so that when the corer again approaches the fruit rest the latter will have the next fruit to be pared in line with the corer to be penetrated by the latter. The outward movement of the swinging arm 100 may be limited by a stop 120 on a rod 121 which is guided through the frame 3 and pivotally connected at 122 to the swinging member 100.

In the second means for presenting the fruit to the corer, the parts are substantially the same with these differences, that the centering means does not turn with the rotary fruit rest 103, and this second means is supported by a bracket 120ª from the swinging arm 100 and a base member 121ª which through bolts 122ª and slots 123 is adjustable laterally on this bracket. On the base member 121ª two centering jaws or members 124 and 125 are pivoted respectively at 126 and 127. The upper end of these centering members have two V shaped portions 129 for cooperating with opposite sides of the fruit. To cause the jaws to have a tendency to more normally toward each other, a compression spring 128 presses at 130 against the base member 121ª and at 131 against an arm depending from the centering member 125. The two centering members are connected by means which causes one to move in one direction as the other moves in the other direction. In this instance, the centering member 125 has a bifurcated arm 132 in which a slide 133 moves, the slide being pivoted at 134 to an arm 135 on the centering member 124. The slide 133 rocks on the pivot 134 and produces an equalizing movement between the two clamping members 124 and 125 as they move toward and from each other. With the end in view of holding the jaws or centering members separated, provision is made, as by a detent 136 which is pivoted at 137 to the centering member 125 and has a shoulder 138 adapted to cooperate with the centering member 124, so as to hold the two centering members separated. A spring 139, secured at one end to the detent and at the other end to the pivot 137, normally tends to hold the detent 136 in detaining position. One end of the detent is projected at 141 whereby it may be shifted to release the centering members to the action of the spring 129. Opening of the jaws to receive the fruit to be centered may be effected by an arm 142 projected forwardly from the centering member 125 above its pivot 127 for engagement by certain means to be described. A cushion 143 is carried by the centering member 125 and projects toward the center member 124 above the pivots of the two members to act as a resilient cushion or resilient stop in order to prevent undue jar on the centering members when they operate without any fruit between them. Means for opening the jaws, in this instance, comprising a cam arm 144 arranged on the plunger 13 and movable with the latter, on the descent of this plunger 13 this cam arm 144 cooperates with the projection 142 on the centering member 125 and moves said centering member as well as the centering member 124 to effect the separation of the centering members, this taking place shortly after the corer starts to enter the fruit on the fruit rest 103 so that the corer may impart to the fruit and the rest 103 a rotation as herein described. On the separation of the jaws, the detent 136 swings to detaining position and holds the jaws separated until such detent is released. The releasing of the detent is effected as the fruit holder approaches its outermost position, this being accomplished, in this instance, by an abutment 145 which projects upwardly in front of the fruit holder or bracket 146 bolted at 147 to the main frame 3.

Two means may be provided for receiving the fruit from the device or corer which supports the fruit during the paring operation. One of these means is designed for collecting the cored and pared fruit in a whole condition, whereas, the other of the means is designed for collecting the cored and pared fruit and directing it to a slicing mechanism which will cut the fruit up into slices.

The first receiving means embodies a chute 148 which is pivotally supported adjacent its lower part at 149 and has a laterally discharging chute portion 150 at its lower end. The pivots 149 are arranged upon a frame 151 which is bolted at 152 to an arm 153 secured to the main frame 3 by bolts 154 below the upper portion of the fruit holder. Projected upwardly and laterally from the upper end of this chute 148 are fingers 155 arranged in such relation that they will form a way on which the fruit may travel into the upper end of the chute 148. Normally the upper end of this way lies to one side of the corer but periodically it is shifted beneath the corer through the pivoting of the receiver chute in order that the fruit pushed off the corer by the push off 48 may be caught by the way and directed to the chute 148. Movement of the receiver may be effected through an arm 156 projected laterally from the fruit holder supporting rod 100 to engage with the chute portion 150 below the pivots 149 as the fruit holder moves outwardly. In other words, the receiver moves to receiving position in line with the corer as the fruit holder moves outwardly to receive another fruit. With the movement of the fruit holder, the receiver moves away from the corer under the action of gravity, its lower end being heavier than its upper end. A stop 157 Fig. 11 on the receiver cooperates with the bracket frame 151 to limit this outward movement.

The other receiver embodies a rod 158 projecting upwardly from a frame 159 which is pivoted at 160 to the bracket arm 146.

This rod is deflected laterally in its intermediate portion, its upper end and lower end being substantially straight. It is so positioned that when in normal position it lies to one side of the corer and during which time the stop 161 on the frame 159 lies in abutment with the arm 146, but this arm may be shifted laterally until the stop 162 engages in a socket 163 on the arm 146 and at this time the upper end of the receiver 158 will lie aligned with the lower end of the corer 8 so that the push-off 47 may move the pared fruit onto the receiver rod. Normally the receiver rod is held away from the corer under the action of the weight 164 depending from the frame 159, but when the fruit holder is moved outwardly to receive another fruit, an arm 165 on the support 100 engages the depending weight 164 and moves the fruit receiver 158 to a position to receive fruit from the corer 8.

For slicing the fruit on this last mentioned construction, slicing means may be provided at the base of the receiver, comprising, in this instance, a plurality of slicing blades 166 radially arranged in the open frame 159 and having the receiver projecting upwardly from the point where said blades meet so that fruit passing down the receiver rod will be directed to the slicing blade. With the end in view of forcing the fruit down the receiver and through the slicer, the slide or plunger 13 carries a pusher 167 which has a head 168 bifurcated and straddling the receiver rod 158. When the fruit is received on the rod 158 the pusher head 168 is moving downwardly to one side of the rod so that the fruit may pass the head after which the head straddles the rod and engages the fruit pushing the latter through the slicer.

The operation of the invention will be understood from the foregoing but it may be summarized as follows; while the fruit holder is in its outer position, a fruit such as an apple, is fed with the stem end resting upon the rotary rest 103 over the opening 107 in the latter. The fruit holder then moves in centered relation to the corer 8 which, at this time, is moving downwardly. During the first part of the penetrating movement of the corer, the blunt end of the corer turns in the apple or fruit and imparts a rotation thereto, due to the fact that the fruit is supported on the rotary rest 103. After the rotation of the fruit is substantially equal to that of the corer, the holding means 8ª on the corer enters the fruit so a positive engagement between the fruit and the corer is established. The corer finally completes its downward movement passing entirely through the fruit and breaking away at the point X the portion of the fruit in the concavity about the lower portion of the opening made by the corer. The paring knife during the movement of the corer 8 downwardly is turned into paring position above the fruit so that by the time the corer 8 completely penetrates the fruit, the knife engages the upper end of the fruit in proximity to the corer. The ejector 32, at this time, is operated to move the apple core out of the corer 8 and the latter starts to move upwardly during which time the apple is pared. When the knife reaches the lower end of the fruit, it pares the entire bottom of the same without any repeeling action, due to the fact, that the skin in the depression at the stem end has been broken away by the corer, thus eliminating all necessity of hand trimming of the fruit. After the paring has been completed, the corer continues to move upwardly, and during this period the knife is shifted bodily away from the corer and immediately thereafter the push-off 47 pushes the apple off the corer 8 through the receiver which has, shortly prior thereto, moved beneath the corer, the holding means also having by this time moved to a position to receive another fruit. The corer now begins its descent and during the first part, the receiver moves away from alignment with the corer, the paring knife returns to its position close to the corer and is thereafter turned over to present its blade downwardly in order to enter into cutting relation with the next fruit to be pared.

In the embodiment illustrated in Figs. 1 to 14 and 22 and 23 included the fruit is removed from the jaws by the corer whereas, in the embodiment shown in Figs. 15 to 21, the jaws are opened soon after the corer starts to penetrate the fruit and closes upon the fruit when the fruit holder reaches the outermost limit of the fruit. In this latter embodiment, with the downward movement of the corer, the pusher enters into engagement with the fruit or the receiver 158 after the fruit has been pushed onto the receiver by the push-off 47 and forces the fruit down the receiver and through the slicer, the receiver being tilted away from this pusher when the fruit first enters on the receiver.

This machine makes it possible to do away with the breaking of large and soft apples, the employment of hand trimmers and waste. The waste is eliminated by making a small core opening, a thinner paring and eliminating and repeeling or hand trimming. The thinner paring also does away with grading and makes it possible to pare both large and small apples on the same machine.

What I claim as my invention and desire to secure by Letters Patent is:

1. In a paring machine, the combination with a rotary support on which the fruit is pared, having a circular portion at one end adapted to enter the fruit to turn therein, and retaining means spaced from the free end of the support for engaging the fruit to cause the latter to turn with the support of a freely rotatable holder on which the fruit is supported while the support enters the fruit to engage said retaining means with the fruit, and mechanism for turning the rotary support while the latter is entering the fruit on the rotatable holder.

2. In a paring machine, the combination with a rotary corer, of a holder for presenting the fruit to the corer having a surface on which the fruit rests and provided with a hole in line with the axis of the corer, a core ejector operating to eject the core through the hole in the fruit holder, and a paring mechanism operating on the fruit on the corer after such ejection.

3. In a paring machine, the combination with a rotary and axially movable fruit support arranged vertically, of paring mechanism for operating on the fruit arranged on said fruit support and a fruit holder movable into and out of alignment with the axis of rotation of said fruit support and below the latter, and having a surface against which the fruit may rest while the fruit support is passing into the fruit and a paring mechanism operating to pare the fruit during the movement of the fruit away from the holder by the supporting device.

4. In a paring machine, the combination with a rotary and axially movable corer arranged vertically, of paring mechanism for operating on the fruit arranged on said corer, and a fruit holder movable into and out of alignment with the axis of rotation of said corer and below the latter, and having a surface against which the fruit may rest while the corer is passing through the fruit, and said fruit holder having an opening in line with the corer, and an ejector for moving the core from the corer into said opening.

5. In a paring machine, the combination with a rotary tubular corer and mechanism for rotating the corer, of an ejector operating in said corer, a lever pivotally connected to the upper end of said corer, a pull bar pivotally connected to said corer and having an abutment thereon, a rotary member driven by the means for rotating the corer and having a rotatable projection periodically engaging said abutment, and means for laterally shifting said pull-bar to move the abutment thereon out of the path of the projection on the rotary member to permit the release of the core ejector.

6. In a paring machine, the combination with a rotary and axially movable corer and means for rotating the corer, of a paring mechanism for operating on the fruit on the corer during the axial movement of the corer, and means for shifting said paring mechanism to carry the knife thereof away from the corer, and a movably mounted push-off for moving the fruit on the corer off the free end of the latter while the paring mechanism has been shifted out of the path of the fruit.

7. In a paring machine, the combination with an axially movable support on which the fruit is pared, said support being rotatably mounted, of a fruit holder rotatable about the axis of turning of said support paring mechanism operating on the fruit on its axial movement away from the holder, and devices for engaging opposite sides of the fruit on the holder to center the latter with reference to the axis of rotation of the support and the axis of rotation of the fruit holder.

8. In a paring machine, the combination with a support on which the fruit is pared, said support being rotatably mounted, of a fruit holder rotatable about the axis of turning of said support, devices for engaging opposite sides of the fruit on the holder to center the latter with reference to the axis of rotation of the support and the axis of rotation of the fruit holder, and means supporting the fruit holder for movement into and out of alignment with the axis of turning of the rotary support to permit the feeding of fruit thereto.

9. In a paring machine, the combination with a support for the fruit, of a rotatably mounted fruit holder, and movable centering jaws for engaging the opposite sides of the fruit to center the latter on the holder for presentation to the fruit support.

10. In a paring machine, the combination with a rotary support on which the fruit is pared, of a paring mechanism comprising a knife carrying arm, a swinging carriage on which the knife carrying arm is movably mounted, spring means normally holding said knife carrying arm on the swinging carriage toward the fruit support, a movable carriage on which the first mentioned carriage is mounted to swing, means for swinging the first mentioned carriage on the second mentioned carriage, and means for moving the second mentioned carriage to carry the knife away from the support in a plane perpendicular to and transverse of the axis of rotation of said support.

11. In a paring machine, the combination with a rotatable support for the fruit, a knife carrying arm, a carriage on which said knife carrying arm is mounted to swing, spring means holding said knife carrying arm toward the fruit on said swinging carriage, an operation having connection with said swinging carriage for swinging the latter in order to cause the knife to travel from one end of the fruit to the other about the fruit, a movable carriage on which the swinging carriage is mounted, and means for moving said movable carriage to carry the knife away from the fruit support in a plane perpendicular to and transverse of the axis of rotation of the rotary support so that the fruit may move in one direction on the fruit support without interference by said knife.

12. In a paring machine, the combination with a rotatable support for the fruit, a knife carrying arm, a carriage on which said knife carrying arm is mounted to swing, spring means holding said knife carrying arm toward the fruit on said swinging carriage, a slide having connection with said swinging carriage for swinging the latter in order to cause the knife to travel from one end of the fruit to the other about the fruit, a movable carriage on which the swinging carriage is mounted, and means for moving said movable carriage after the fruit has been pared by the paring mechanism to carry the knife away from the fruit support so that the fruit may be pushed off the fruit support, and means controlled by the slide which operates the swinging carriage for preventing the movement of the movable carriage during the paring operation.

13. In a paring machine, the combination with a rotary support for the fruit to be pared, of a paring mechanism embodying a pivotally mounted knife carrying arm, a swinging carriage on which said knife arm is mounted, spring means moving the knife carrying arm toward the fruit on the support, a slide having connection with said swinging carriage for swinging the latter in order to cause the knife to travel from one end of the fruit to the other about the fruit, a carriage on which the swinging carriage is mounted, spring means acting on said carriage to hold the latter in position to cause the knife to operate on the fruit on the support, and means movable with the slide to engage said movable carriage to move the latter against the action of the spring after the paring operation is completed so as to carry the knife away from the supporting device in order that the fruit may be pushed off the supporting device.

14. In a paring machine, the combination with a support on which the fruit is pared, of a paring mechanism comprising a knife carrying arm, a swinging carriage on which the knife carrying arm is pivotally mounted, spring means normally holding the knife carrying arm on the swinging carriage toward the fruit support, a second swinging carriage mounted to turn about an axis at right angles to the axis of turning of the first mentioned swinging carriage, spring means acting on the second mentioned swinging carriage to hold the knife on the knife carrying arm toward the fruit support, a slide having connection with the first mentioned swinging carriage for turning the latter about its axis to cause the knife to travel from one end of the fruit to the other about the fruit, and means movable with the slide and cooperating with the second mentioned swinging carriage to move the latter against the action of the spring after the paring is completed so as to carry the knife away from the fruit support in order that the fruit may be pushed off such support.

15. In a paring machine, the combination with a support on which the fruit is pared, of a paring mechanism comprising a knife carrying arm, a swinging carriage on which the knife carrying arm is pivotally mounted, spring means normally holding the knife carrying arm on the swinging carriage toward the fruit support, a second swinging carriage mounted to turn about an axis at right angles to the axis of turning of the first mentioned swinging carriage, spring means acting on the second mentioned swinging carriage to hold the knife on the knife carrying arm toward the fruit support, a slide having connection with the first mentioned swinging carriage for turning the latter about its axis to cause the knife to travel from one end of the fruit to the other about the fruit, means movable with the slide and cooperating with the second mentioned swinging carriage to move the latter against the action of the spring after the paring is completed so as to carry the knife away from the fruit support in order that the fruit may be pushed off such support, and means movable with the slide for cooperating with the second mentioned swinging carriage to hold the latter against swinging during the paring operation.

16. In a paring machine, the combination with a main frame, and a fruit support rotatably and axially movable on said main frame, of a carriage pivotally mounted on the main frame, a second carriage mounted to swing on the first mentioned carriage about an axis at right angles thereto, a knife carrying arm mounted to swing on the second mentioned carriage about an axis at an angle to the axis of swinging of said second mentioned carriage, spring means normally holding the knife carrying arm toward the fruit on the fruit support, a slide movable on the main frame and having connection with the second mentioned carriage to swing the latter on the first mentioned carriage in order to cause the knife to travel from one end of the fruit to the other and about the fruit, spring means uring the first mentioned carriage to move in one direction, means moving with the slide and engaging the first mentioned carriage to move the latter against the action of the spring means in order to carry the knife away from the fruit support so as to permit the fruit to be pushed off the said support, and means moving with the slide for holding the first mentioned carriage against swinging while the fruit is being pared.

17. In a paring machine, the combination with a vertically arranged and axially movable support on which the fruit is pared, of a fruit holder mounted below said fruit support, and a paring mechanism operating on the fruit to pare the latter as the fruit support moves away from the fruit holder.

18. In a paring machine, the combination with a vertically arranged and axially movable rotary fruit support, of a fruit holder movably mounted below the fruit support to move into and out of alignment with said fruit support, a paring mechanism for operating on fruit on the fruit support as the latter moves in an upward direction, a movably mounted receiver for the pared fruit, means for moving the receiver to receive fruit from the fruit support after the paring of such fruit and while the support is away from its lowest position, and a push-off for moving the fruit off the rotary support to the receiver after the latter has been moved to receiving position.

19. In a paring machine, the combination with a vertically arranged and axially movable rotary fruit support, of a fruit holder movably mounted below the fruit support to move into and out of alignment with said fruit support, a paring mechanism for operating on fruit on the fruit support as the latter moves in an upward direction, a movably mounted receiver for the pared fruit, means for moving the receiver to receive the fruit from the fruit support after the paring of such fruit and while the support is away from its lowest position, and a push-off for moving the fruit off the rotary support to the receiver after the latter has been moved to receiving position, said receiver comprising a rod having its upper end formed to be aligned with the fruit support when the receiver is in receiving position.

20. In a paring machine, the combination with a vertically arranged and axially movable rotary fruit support, of a fruit holder movably mounted below the fruit support to move into and out of alignment with said fruit support, a paring mechanism for operating on fruit on the fruit support as the latter moves in an upward direction, a movably mounted receiver for the pared fruit, means for moving the receiver to receive fruit from the fruit support after the paring of such fruit and while the support is away from its lowest position, and a push-off for moving the fruit off the rotary support to the receiver after the latter has been moved to receiving position, said receiver comprising a rod having its upper end formed to be aligned with the fruit support when the receiver is in receiving position, a slicing device to which the pared fruit is guided by the receiver, and means for moving the fruit through the slicing device.

21. In a paring machine, the combination with a rotary and axially movable fruit support, of a pivotally mounted fruit holder movable into and out of alignment with the fruit support, and from which the fruit is removed by the fruit support, a paring mechanism for cooperating with the fruit on the fruit support as the latter moves in an upward direction, a movably mounted receiver moved to receive the fruit from the fruit support when the fruit holder is moved out of alignment with such fruit support, and a push-off moving the fruit off the supporting device to the receiver when the receiver is in receiving position and the fruit support is away from its lowest position.

22. In a paring machine, the combination with a rotary and axially movable fruit support, and a fruit holder movable into and out of alignment with the fruit support and from which the fruit is removed from the fruit support, of paring mechanism for cooperating with the fruit on the fruit support, a movably mounted rod having its upper end formed to be moved into and out of alignment with the fruit support to receive pared fruits from the latter, a slicer arranged at the lower end of said receiving rods, and means movable to force the fruit through the slicer as the fruit supporting device moves axially to remove the fruit from the holder.

23. In a paring machine, the combination with a rotary support on which the fruit is pared, of a fruit holder movable into and out of alignment with the fruit support comprising a rotatable portion on which the fruit rests, and means for centering the fruit on the rotatable portion supported so that the rotatable portion turns relatively thereto.

24. In a paring machine the combination with a rotatable fruit support, and a fruit holder movable into and out of alignment with the axis of rotation of the fruit support, one of said elements being movable axially to permit the fruit support to penetrate the fruit on the fruit holder, and the fruit holder having a portion on which the fruit rests freely rotatable so that the fruit may be turned on said holder by the fruit support.

25. In a paring machine the combination with a rotatable fruit support, and a fruit holder movable into and out of alignment with the axis of rotation of the fruit support, one of said elements being movable axially to permit the fruit support to penetrate the fruit on the fruit holder, and the fruit holder having a portion on which the fruit rests freely rotatable so that the fruit may be turned on said holder by the fruit support, and movable centering means for centering the fruit on said rotatable part.

26. In a paring machine the combination with a rotatable fruit support, and a fruit holder movable into and out of alignment with the axis of rotation of the fruit support, one of said elements being movable axially to permit the fruit support to penetrate the fruit on the fruit holder, and the fruit holder having a portion on which the fruit rests freely rotatable so that the fruit may be turned on said holder by the fruit support, movable centering means for centering the fruit on said rotatable part, and means for effecting the release of the fruit by the centering means to permit the rotary support to turn the fruit.

27. In a paring machine, the combination with a rotatable fruit support, and a fruit holder movable into and out of alignment with the axis of rotation of the fruit support, one of said elements being movable axially to permit the fruit support to penetrate the fruit on the fruit holder, and the fruit holder having a portion on which the fruit rests freely rotatable so that the fruit may be turned on said holder by the fruit support, movable centering means for centering the fruit on said rotatable part, means for effecting the release of the fruit by the centering means to permit the rotary support to turn the fruit, and means for effecting the closing of the centering means upon the fruit while the fruit holder is out of alignment with the rotary support.

28. In a paring machine, the combination with a vertically arranged rotatable and axially movable fruit support, of a fruit holder arranged below the support and movable into and out of alignment with said fruit support, said fruit holder having a rotatable portion on which the fruit rests and centering means supported so that the rotatable portion turned relatively thereto, said centering means centering the fruit on said rotatable portion in order that the fruit holder may penetrate the fruit in line with the axis of rotation of said rotatable portions, means for effecting the closing of the centering means on the fruit while the fruit holder is out of alignment with the rotary support, and means for releasing the fruit from the centering means after the fruit holder has been aligned with said rotary fruit support so that the fruit may turn with the fruit support during the penetration of the fruit by such support.

29. In a paring machine, the combination with a vertically arranged rotatable and axially movable fruit support, of a swinging fruit holder mounted below the support and movable into and out of alignment with the rotary fruit holder, said fruit holder comprising a portion on which the fruit rests for penetration by the fruit support upon the axial movement of the latter two pivoted centering jaws for centering the fruit on the rest portion of the fruit holder, spring means normally urging said jaws together, a detent for holding said jaws separated, means operating the detent to release the jaws when the swinging fruit holder is swung out of alignment with the fruit support, and means for effecting the opening of the jaws against the action of the spring means when the fruit holder is in alignment with the axially movable fruit support.

30. In a paring machine, the combination with a rotary support on which the fruit is pared, and a spring pressed knife carrying arm mounted to swing about two axis, one to carry the knife back and forth in an arc about the fruit from one end thereof to the other and the other to permit the knife to adapt itself to fruit of different sizes, two relatively movable cooperating portions for effecting the swinging of the arm about one of its axis, at least one of which swings with the knife carrying arm when the latter swings from one end of the fruit to the other, and mechanism for moving that portion which swings with the knife carrying arm to carry said portion out of operating cooperation with its cooperating portion in order to move the knife carrying arm in a plane transverse and perpendicular to the axis of rotation of the rotary support to a position where the fruit may be moved in one direction on the fruit support without interfering with the knife.

31. In a paring machine, the combination with a rotary support on which the fruit is pared, and means for imparting continuous rotation to said support during the operation of the machine, of a feeding mechanism presenting the fruit to the continuously rotating support having a rotatable part against which the fruit rests so that when the fruit is penetrated by the support, the rotating part will permit the turning of the fruit on the feeding mechanism.

32. In a paring machine, the combination with a rotary fruit support and means for turning said support continuously during the operation of the machine, of a feeding mechanism for presenting the fruit to the support for penetration by the support, said feeding mechanism having movable centering means gripping the sides of the fruit and means for releasing the fruit from said centering means before the penetrating movement has been completed to permit the fruit to turn with the support.

33. In a paring machine, the combination with a rotary support on which the fruit is pared and a paring mechanism to operate on the fruit on said support, of means for supporting said support so that its axis of rotation does not shift laterally, a receiver to which the pared fruit is moved from the support movable into and out of alinement with the axis of rotation of the support, a feeding mechanism having a fruit holder movable into and out of alinement with the support, mechanism for alternately shifting the receiver and the fruit holder into and out of alinement with the axis of rotation of the support, and means operating on the paring mechanism for shifting the latter in a plane transverse of and perpendicular to the axis of rotation of the rotary support and out of operative position while the fruit is being moved in one direction on the support.

34. In a paring machine, the combination with a rotary support on which the fruit is pared, of a paring mechanism comprising a pivoted knife carrying arm, a swinging carriage on which said knife carrying arm is mounted to turn about an axis at right angles to the axis of turning of the knife carrying arm, means for supporting said carriage to swing about an axis at right angles to its axis of swinging and parallel with the axis of rotation of the rotary support so that said swinging carriage may swing to carry the knife away from axis of turning of the fruit support and in a plane perpendicular to said axis without disturbing the position of the knife carrying arm on its carriage.

35. In a paring machine, the combination with a rotary support on which the fruit is pared, a knife carrying arm, and a swinging carriage on which the knife carrying arm is pivoted, of a second swinging carriage on which the first mentioned carriage is mounted to swing, said second mentioned carriage being mounted to swing about an axis at an angle to the axis of turning of the first mentioned carriage, an operator for swinging the first mentioned carriage about its axis to cause the knife to travel in an arc from one end of a fruit on the rotary support to the other, and means for supporting the operator so that as the second mentioned carriage swings on its axis it carries the first mentioned carriage out of engagement with the operator and the knife laterally away from the axis of turning of the rotary support.

36. In a paring machine, the combination with a rotary and axially movable fruit support on which the fruit is pared, of mechanism for moving the support axially back and forth a fixed distance each time, a fruit holder movable into and out of the line of movement of the fruit support, mechanism for moving the support into and out of such alignment while the fruit support is away from its position nearest the fruit holder, and mechanism for paring the fruit while the fruit support is away from its position nearest the fruit holder.

37. A paring machine comprising a rotary and axially movable support on which the fruit is pared, a fruit holder from which the fruit is removed when the support is moved axially to one position, a receiver for receiving the fruit from the supporting device while the latter is away from such position, and mechanism for alternately moving the support and the receiver into and out of the axial line of movement of the fruit support.

38. In a paring machine, the combination with a rotary support on which the fruit is pared, a fruit holder for presenting fruit to the rotary support, and mechanism for effecting a relative movement between the rotary support and the fruit holder to cause the fruit on the holder to be impaled by the rotary support, of a paring mechanism for paring the fruit on the rotary support, comprising a pivoted knife carrying arm, a carriage on which the knife carrying arm is pivoted, a second carriage on which the first named carriage is mounted to swing about an axis at right angle to the pivot of the knife carrying arm, and means supporting said second named carriage to swing about an axis parallel with the axis of rotation of the rotary support to carry the knife head toward and from the axis of rotation of the rotary device at right angles to and extending transversely of said axis.

BURTON C. COONS.